United States Patent [19]

Harris, Sr. et al.

[11] 3,960,111
[45] June 1, 1976

[54] NESTING SUPPORT APPARATUS FOR FOWL

[75] Inventors: Barron M. Harris, Sr., Holiday, Fla.; Doyle F. Johnson, Lawrenceville, Ga.

[73] Assignee: North American Culvert Corporation, Clearwater, Fla.

[22] Filed: May 22, 1975

[21] Appl. No.: 579,812

[52] U.S. Cl. ................................................. 119/23
[51] Int. Cl.² ......................................... A01K 31/14
[58] Field of Search ............ 119/23, 26, 51 R, 157, 119/45

[56] References Cited
UNITED STATES PATENTS

| | | | |
|---|---|---|---|
| 1,093,602 | 4/1914 | Bonner | 119/45 R |
| 1,987,347 | 1/1935 | Moore | 119/23 |
| 3,017,858 | 1/1962 | Brown | 119/23 |
| 3,045,647 | 7/1962 | Bristle | 119/157 |

Primary Examiner—Hugh R. Chamblee
Attorney, Agent, or Firm—Jones, Thomas & Askew

[57] ABSTRACT

Apparatus for supporting the nests of waterfowl or other birds above the surface of water or land for protection from predators. The nesting support apparatus includes an open nest supporting structure in which a permanent nest may be built by the fowl. Drains in the supporting structure prevent precipitation from collecting in the nest. The nest supporting structure is supported in elevation above a self-supporting base structure which can be received on a lake bottom, for example, so as to maintain the nest supporting structure a sufficient distance above the surface of the water. The entire nesting support apparatus is easily dismantled and assembled, so that the apparatus can be transported knocked-down for assembly at a point of use.

8 Claims, 2 Drawing Figures

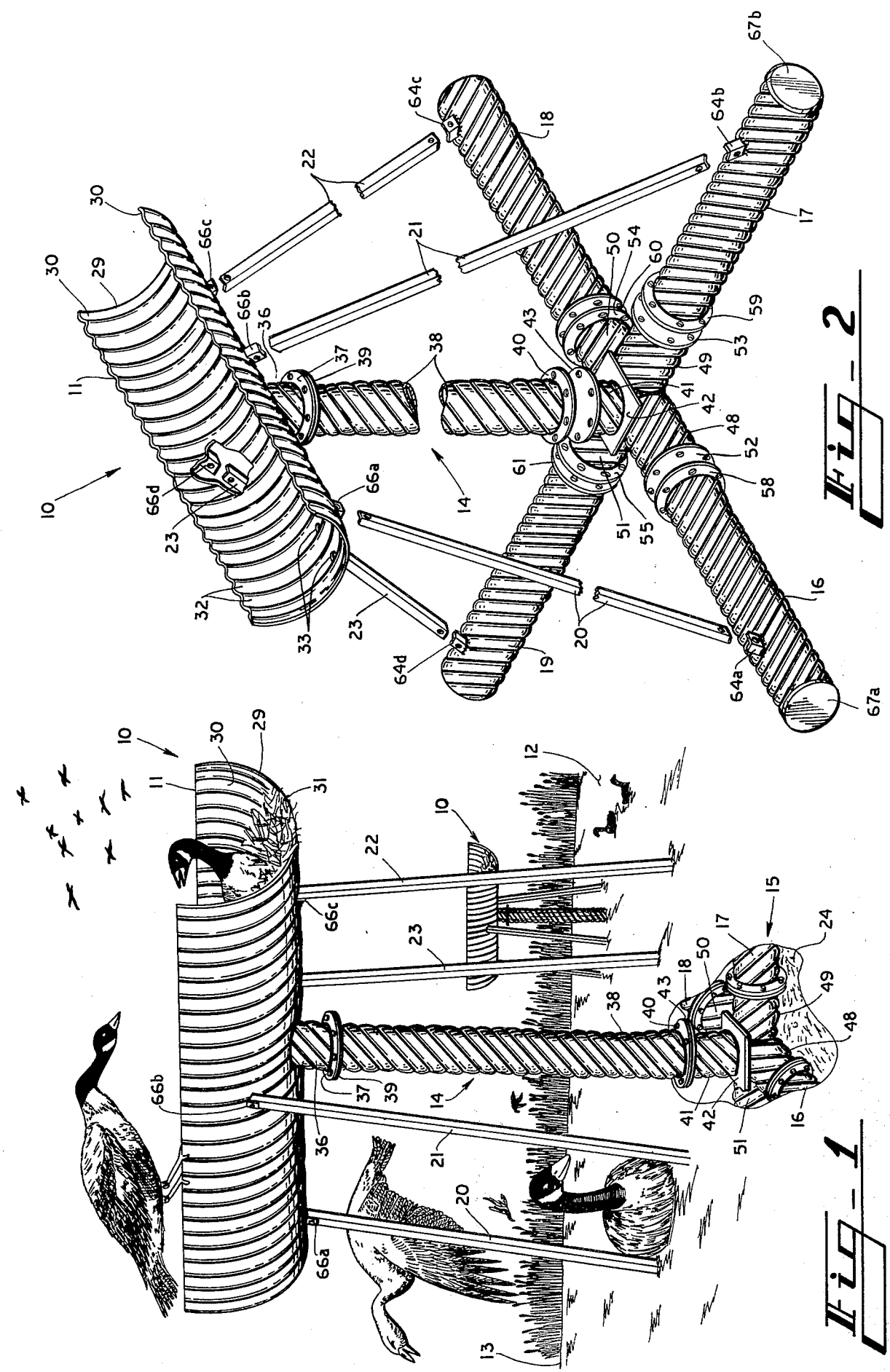

NESTING SUPPORT APPARATUS FOR FOWL

This invention relates in general to nesting apparatus and in particular to apparatus which supports nests in protective elevation above the surface of surrounding water or terrain.

It is frequently desired to make a particular area more attractive for the nesting and reproduction of waterfowl or other wild birds. While such birds are generally quite capable of constructing their own nests from naturally-available material, the birds may instinctively construct their nests in locations which are relatively open to attack by natural predators. Consequently, either the eggs or the fledglings in the nest are frequently attacked by rabbits, foxes, or other natural predators. While some of the fledglings may suvive to maturity, assuming that a reasonable balance between nesting birds and predators exists, it is evident that the bird population cannot rapidly be replaced or reinforced under such circumstances.

While offshore nesting platforms can prevent land-based predators from easily reaching the nests, it will be understood that wild waterfowl tend to nest along lakes, swampy areas, or similar locations which are not conducive to the on-site construction and erection of nesting support platforms. Such locations may be accessible only on foot, or by small boats, so that it becomes impractical either to transport an assembled platform structure or to construct a substantial platform at the location. Moreover, a practical nesting support structure should be sufficiently durable to last for at least several nesting seasons without requiring any repair or maintenance, and should provide adequate drainage for the nests.

Stated in general terms, the present invention provides a nesting support structure including an upwardly facing depressed area in which a waterfowl or other bird can construct a nest of natural materials. The nest supporting structure is mounted on upright support structure which extends upwardly from a base. The base is designed to support the upright structure and the attached nesting support structure in self-supporting relation when the base is disposed on a lake bottom, for example, so that the nest support structure is maintained far enough above the water surface to provide safety of the nest from predators and the like. In a preferred embodiment of the present invention, the nest support structure is provided by an inverted hemicylindrical section of corrugated culvert which is provided with apertures for draining precipitation.

Accordingly, it is an object of the present invention to provide an improved nesting support structure for waterfowl or the like.

It is another object of the present invention to provide nesting support structure which is readily transportable while disassembled and easily assembled at the location of use.

Other objects and advantages of the present invention will become apparent from the following description of a disclosed embodiment, including the drawing in which:

FIG. 1 shows a pictorial view of the disclosed embodiment; and

FIG. 2 shows an exploded view of the disclosed embodiment.

Turning to FIG. 1, there is shown a nesting support apparatus indicated generally at 10 and having a nesting support member 11 supported above the surface 12 of a lake or other body of water, at a location which is offshore from the shoreline 13. The nesting support member 11 is supported and maintained in its elevated position above the water surface by means of a centrally-located vertical support 14, which may take the form of a hollow pipe or the like. The lower end of the vertical support 14 terminates in a base, indicated generally at 15, which in the disclosed embodiment has four legs 16, 17, 18, and 19 radiating outwardly at right angles from each other and from the vertical support 14. Each of the legs is connected to the nesting support member 11 by separate braces 20, 21, 22, and 23. The legs 16-19 are preferably sufficiently long to allow the entire nesting support apparatus 10 to be self-supporting when the base 15 reposes on a reasonably level bottom surface 24.

It is seen in both FIGS. 1 and 2 that the nesting support member 11 is provided in the disclosed embodiment by a length of corrugated pipe that has been longitudinally split to provide a proximately hemicylindrical upwardly-facing receptacle 29 of corrugated pipe. The upwardly-facing bowl or receptacle 29 provided by the hemicylindrical pipe segment is partially surrounded by the sides 30, and this receptacle is conducive to the construction of natural nests 31 by waterfowl such as geese and the like. Each of the corrugations 32 within the receptacle 29 is provided with a drain opening 33 at the lowermost point within the corrugation, to allow rain and other precipitation to drain from the receptacle.

Attached to the underside of the receptacle 29 at approximately its midpoint, so as to be situated at the center of gravity of the receptacle, is a pipe stub 36 which terminates in a flange ring 37. The pipe stub 36 can be attached to the pipe segment which comprises the receptacle 29 by welding or by any other suitable fastening technique. The vertical support 14 is further provided by a pipe section 38 of desired length and having flange rings 39 and 40 at the respective upper and lower ends. The remaining vertical extent of the vertical support 14 is provided by a pipe stub 41 secured to a mounting plate 42 at the lower end, and having a flange ring 43 attached to the upper end. The pipe stub 41 is part of the base 15, as described below. The flange rings 39 and 40 are provided with a number of holes which are aligned with corresponding holes extending through each of the flange rings 37 and 43, so that the pipe 38 is readily attachable to the pipe stub 36 of the nesting support member 11 and to the pipe stub 41 which extends upwardly from the base 15. The pipe 38, as well as the pipe stubs 36 and 41, may be made of corrugated or straight-wall pipe as appropriate.

The base 15 of the disclosed embodiment includes a central body 47 which includes the mounting plate 42 with attached pipe stub 41, and which additionally includes the four pipe sections 48, 49, 50, and 51 connected to radiate outwardly from the central body substantially at right angles to each other and to the upright pipe stub 41. The four radial pipe sections 48-51 form a cross, as shown in FIG. 2, and the pipe sections may be centrally joined together by welding or the like. The mounting plate 42 is welded or otherwise secured onto one side of the cross formed by the radial pipe sections. Each of the radial pipe sections 48-51 may be approximately six inches long, by way of example only, and each such pipe section is provided with respective flange rings 52, 53, 54, 55, at the outer ends of the pipe sections.

The base 15 is completed by the aforementioned legs 16-19, each of which is equipped at one end with respective flange rings 58, 59, 60, and 61 which have bolt-receiving holes aligned with corresponding holes in the flange rings 52-55 on the pipe sections 48-51 which radiate outwardly from the central body 47. The legs 16–19 can be made of any appropriate corrugated or straight pipe, in a manner similar to the pipe 38. Each of the legs 16–19 is preferably at least partly filled with a heavy material such as concrete or the like to give negative buoyancy to the overall nesting support 10. The outer ends of the legs 16–19 can be closed with caps exemplified at 67a and 67b.

A separate bracing attachment member 64a, 64b, 64c, and 64d is attached by welding or the like to the upper side of each leg 16–19, adjacent the outer ends of the legs as shown in FIG. 2. Each of the bracing attachments 64a–64d may be provided by a short length of angle iron, for example, which contains one or more pre-drilled holes of a size and location to mate with at least one corresponding hole at the lower end of each brace 20–23. The upper ends of the braces 20–23 are connected to another set of bracing attachments 66a–66d. A first pair of the upper bracing attachments 66a and 66c is attached to the underside of the pipe segment comprising the receptacle 29 adjacent the open opposite ends thereof, while the other pair of upper bracing attachments 66b and 66d are attached to the underside of the pipe segment on opposite sides of the pipe stub 36, in spaced apart relation to the pipe stub. It will be appreciated that each of the upper bracing attachments 66a–66b is provided with one or more pre-drilled holes of a size and location to mate with a corresponding hole at the upper end of the braces 20–23.

Since a portion of the nesting support apparatus 10 is typically partially submerged, with the remainder of the support apparatus being closely proximate to water, the entire nesting support apparatus is preferably made of a material which is resistant to rust and corrosion. In a specific embodiment of the present apparatus, the pipe sections and the braces are fabricated from steel which is provided with a galvanized coating to protect against rust, and the various interconnecting welds are coated with galvanized paint in a manner known to those skilled in the art.

Considering the application of the present invention, it will be understood that the various component parts of the nesting support apparatus 10 are preferably fabricated at any suitable location, which is typically located some distance from a lake or other location where waterfowl prefer to built their nests. Once the component parts have been fabricated, these parts are relatively easily transportable to the site of use whereat the parts are quickly assembled into the complete structure shown in FIG. 1. The assembly operation is completed using only nuts, bolts, and standard wrenches, with no on-site welding or metal working being necessary. The entire assembled nesting support apparatus is then positioned where desired, so as to provide appropriate locations for waterfowl to construct their nests free from attach by landborne predators.

It will be understood that the foregoing relates only to a preferred embodiment of the present invention, and that numerous alterations and modifications may be made therein without departing from the spirit and the scope of the invention as defined in the following claims.

What is claimed is:

1. Apparatus providing a nesting support for waterfowl or the like, comprising:
   nesting means defining an open upwardly facing receptacle to receive and support the nest of a waterfowl or the like;
   drain means in communication with said receptacle to allow precipitation to flow by gravity from said nesting means;
   at least one upright support means having an upper end attached to said nesting means and extending downwardly a predetermined distance therefrom to terminate at a lower end;
   base means attached to said lower end of said support means and providing a downwardly directed surface support of area sufficient to rest on a surface while selfsupportively maintaining said support means and said attached nesting means in upstanding relation to said base means;
   said nesting means comprising a length of hemicylindrical corrugated pipe attached to said support means to maintain the corrugated pipe in upwardly-facing concave position; and
   said drain means being provided by a separate drain hole formed at the lowermost point in each corrugation of said upwardly-facing corrugated pipe.

2. Apparatus as in claim 1, wherein:
   said base means comprises a central body and a plurality of tubular members attached to and radiating outwardly a distance from said central body to provide said surface support;
   said support means comprises a central support member detachably connected to said central body and extending upwardly therefrom for detachable connection to said corrugated pipe at substantially the center of gravity thereof;
   a first pair of brace members separately attached adjacent to the opposite longitudinal ends of said corrugated pipe and extending downwardly for respective attachment to a first pair of said tubular members; and
   a second pair of brace members separately attached to said corrugated pipe in laterally spaced apart relation to said center of gravity and extending downwardly for respective attachment to a second pair of said tubular members.

3. Apparatus as in claim 1, wherein:
   said base means comprises a central body and a plurality of foot means attached to said central body and symmetrically radiating outwardly therefrom to provide said surface support.

4. Apparatus as in claim 3, wherein:
   said support means comprises a central support member attached to said central body of said base means and extending upwardly therefrom for attachment to said nesting means at substantially the center of gravity thereof; and
   a separate brace member attached to each of said foot means of said base means and extending upwardly for attachment to said nesting means at locations which are spaced outwardly from said center of gravity.

5. Apparatus as in claim 4, wherein said central support member is detachably connected to said central body and to said nesting means; and each of said brace members is separately detachably connected to the respective foot means and said nesting means.

6. Apparatus as in claim 4, wherein:

said central support member is detachably connected to at least one of said central body and said nesting means by flange connecting means;

said flange connecting means comprising a first flanged member attached to said central support, and a second flanged member connectable to said first flanged member.

7. Apparatus as in claim 4, wherein:

said central support member comprises a length of pipe extending between said central body and said nesting means; and means at each end of said length of pipe for detachable connection to said central body and to said nesting means, respectively.

8. Appartus as in claim 7, wherein:

said nesting means comprises a length of hemicylindrical corrugated pipe detachably connected to the upper end of said support member pipe to maintain the hemicylindrical corrugated pipe in upwardly-facing concave position so as to provide said depressed area.

* * * * *